(12) United States Patent
Shenoy et al.

(10) Patent No.: US 10,523,560 B2
(45) Date of Patent: *Dec. 31, 2019

(54) SERVICE LEVEL AGREEMENT BASED NEXT-HOP SELECTION

(71) Applicant: Juniper Networks, Inc., Sunnyvale, CA (US)

(72) Inventors: Nagaraja Manikkar Shenoy, Bangalore (IN); Prasad V, Bangalore (IN); Kaushik Dutta Majumdar, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 119 days.

This patent is subject to a terminal disclaimer.

(21) Appl. No.: 15/663,052

(22) Filed: Jul. 28, 2017

(65) Prior Publication Data

US 2019/0036813 A1   Jan. 31, 2019

(51) Int. Cl.
*H04L 12/721* (2013.01)
*H04L 12/24* (2006.01)
(Continued)

(52) U.S. Cl.
CPC .......... *H04L 45/34* (2013.01); *H04L 12/4633* (2013.01); *H04L 12/4641* (2013.01);
(Continued)

(58) Field of Classification Search
CPC ............. H04L 12/4633; H04L 12/4641; H04L 41/5019; H04L 41/5003; H04L 45/34;
(Continued)

(56) References Cited

U.S. PATENT DOCUMENTS 7,334,047 B1   2/2008   Pillay-esnault
7,468,956 B1   12/2008  Leelanivas et al.
(Continued)

FOREIGN PATENT DOCUMENTS

EP   2985951 A1   2/2016
EP   3051758 A1   8/2016

OTHER PUBLICATIONS

Response to Office Action dated Jul. 25, 2018, from U.S. Appl. No. 15/663,075, filed Oct. 25, 2018, 11 pp.
(Continued)

*Primary Examiner* — Alpus Hsu
*Assistant Examiner* — Camquyen Thai
(74) *Attorney, Agent, or Firm* — Shumaker & Sieffert, P.A.

(57) ABSTRACT

Techniques are described for selecting paths in accordance with service level agreements. For example, spoke and hub routers may advertise routes associated with virtual routing and forwarding (VRF) instances mapped to service level agreements (SLAs). A virtual route reflector of an intermediate router may receive route advertisements and may add respective path communities associated with particular links selected based on link state measurements in accordance with the SLAs. The hub or spoke routers may receive the route advertisements including a respective path community and install the selected path as a next-hop for a given SLA. In this way, spoke and hub routers may forward traffic on links that satisfy particular SLAs such that Quality of Experience (QoE) for an application may be restored or improved.

15 Claims, 7 Drawing Sheets

(51) Int. Cl.
*H04L 12/707* (2013.01)
*H04L 12/46* (2006.01)
*H04L 12/715* (2013.01)
*H04L 12/751* (2013.01)
*H04L 12/703* (2013.01)
*H04L 12/723* (2013.01)

(52) U.S. Cl.
CPC .......... *H04L 41/5019* (2013.01); *H04L 45/02* (2013.01); *H04L 45/24* (2013.01); *H04L 45/28* (2013.01); *H04L 45/50* (2013.01); *H04L 45/64* (2013.01); *H04L 41/5003* (2013.01)

(58) Field of Classification Search
CPC .......... H04L 45/02; H04L 45/24; H04L 45/28; H04L 45/50; H04L 45/64
See application file for complete search history.

(56) References Cited

U.S. PATENT DOCUMENTS

| | | | |
|---|---|---|---|
| 7,590,074 B1* | 9/2009 | Dondeti | H04L 12/4675 370/254 |
| 8,085,690 B1 | 12/2011 | Leelanivas et al. | |
| 8,861,356 B2 | 10/2014 | Kozat et al. | |
| 9,043,487 B2 | 5/2015 | Retana et al. | |
| 9,055,139 B1 | 6/2015 | Devireddy et al. | |
| 9,577,943 B1 | 2/2017 | Bhandarkar | |
| 9,674,108 B1* | 6/2017 | Ryan | H04L 47/70 |
| 9,967,350 B2 | 5/2018 | Rao | |
| 9,983,860 B1 | 5/2018 | Koty et al. | |
| 10,021,197 B2 | 7/2018 | Rao | |
| 10,027,768 B2 | 7/2018 | Rao | |
| 2005/0025069 A1* | 2/2005 | Aysan | H04L 12/4641 370/254 |
| 2007/0115990 A1* | 5/2007 | Asati | H04L 45/00 370/392 |
| 2010/0214932 A1* | 8/2010 | Qian | H04L 41/0677 370/244 |
| 2013/0159550 A1 | 6/2013 | Vasseur | |
| 2014/4146664 | 5/2014 | Amante | |
| 2014/0297847 A1 | 10/2014 | Heinz et al. | |
| 2015/0089057 A1 | 3/2015 | Ravindran et al. | |
| 2015/0092538 A1 | 4/2015 | Vasseur et al. | |
| 2015/0195178 A1 | 7/2015 | Bhattacharya et al. | |
| 2015/0222557 A1 | 8/2015 | Bhattacharya | |
| 2015/0237097 A1 | 8/2015 | Devireddy et al. | |
| 2015/0372874 A1 | 12/2015 | Nuss et al. | |
| 2015/0381493 A1* | 12/2015 | Bansal | H04L 45/30 370/392 |
| 2016/0191325 A1* | 6/2016 | Pacella | H04L 41/12 370/254 |
| 2016/0337175 A1 | 11/2016 | Rao | |
| 2016/0337179 A1 | 11/2016 | Rao | |
| 2016/0337180 A1 | 11/2016 | Rao | |
| 2017/0012870 A1 | 1/2017 | Blair et al. | |
| 2017/0054628 A1* | 2/2017 | Tomotaki | H04L 45/06 |
| 2017/0104676 A1* | 4/2017 | Patel | H04L 45/70 |
| 2019/0036807 A1 | 1/2019 | Rikiso et al. | |

OTHER PUBLICATIONS

Extended Search Report from counterpart European Application No. 18185948.9, dated Nov. 21, 2018, 9 pp.
Final Office Action from U.S. Appl. No. 15/663,075, dated Feb. 4, 2019, 17 pp.
Office Action from U.S. Appl. No. 15/663,075, dated Jul. 25, 2018, 14 pp.
Bradner et al., "Benchmarking Methodology for Network Interconnect Devices," RFC 2544, Network Working Group, Mar. 1999, 31 pp.
Marques et al., "Internal BGP as the Provider/Customer Edge Protocol for BGP/MPLS IP Virtual Private Networks (VPNs)," RFC 6368, Internet Engineering Task Force (IETF), Sep. 2011, 14 pp.
Bates et al., "BGP Route Reflection: An Alternative to Full Mesh Internal BGP (IBGP)," RFC 4456, Network Working Group, Apr. 2006, 12 pp.
Rekhter et al., "A Border Gateway Protocol 4 (BGP-4)," RFC 4271, Network Working Group, Jan. 2006, 104 pp.
Rosen et al., "BGP/MPLS IP Virtual Private Networks (VPNs)," RFC 4364, Network Working Group, Feb. 2006, 47 pp.
Sangli et al., "BGP Extended Communities Attribute," RFC 4360, Network Working Group, Feb. 2006, 12 pp.
"OAM functions and mechanisms for Ethernet based networks—Series Y: Global Information Infrastructure, Internet Protocol Aspects and Next-Generation Networks: Internet protocol aspects—Operation, administration and maintenance," ITU-T Telecommunication Standardization Sector of ITU, Y.1731, May 2006, 80 pp.
Farinacci et al., "Generic Routing Encapsulation (GRE)," RFC 2784, Network Working Group, Mar. 2000, 9 pp.
Kent et al., "Security Architecture for the Internet Protocol," RFC 4301, Network Working Group, Dec. 2005, 101 pp.
U.S. Appl. No. 15/663,075, by Juniper Networks, Inc. (Inventors: Sheynoy et al.), filed Jul. 28, 2017.
Amendment in Response to Office Action dated Feb. 4, 2019, from U.S. Appl. No. 15/663,075, filed Apr. 4, 2019, 12 pp.
Notice of Allowance from U.S. Appl. No. 15/663,075, dated Jun. 12, 2019, 10 pp.
Response to Extended Search Report dated Nov. 21, 2018, from counterpart European Application No. 18185948.9, filed Jul. 29, 2019, 16 pp.
Intent to Grant dated Sep. 23, 2019, from counterpart European Application No. 18185948.9, 38 pp.

* cited by examiner

SERVICE LEVEL AGREEMENT BASED NEXT-HOP SELECTION

TECHNICAL FIELD

The disclosure relates to computer networks and, more particularly, to routing packets within computer networks.

BACKGROUND

An enterprise network may include a number of devices, such as computers, owned or administered by a single enterprise. These devices may be grouped into a number of site networks, which in turn may be geographically distributed over a wide area. Each site network may include one or more local area networks (LANs).

An enterprise network may represent a Layer 3 (L3) computer network, where reference to a layer followed by a number refers to a corresponding layer in the Open Systems Interconnection (OSI) model. An enterprise network is an L3 network in the sense that it natively supports L3 operations as described in the OSI model. Common L3 operations include those performed in accordance with L3 protocols, such as the Internet protocol (IP). L3 is also known as a "network layer" in the Open Standards Interconnection model and the "IP layer" in the TCP/IP model, and the term L3 may be used interchangeably with the and "network layer" and "IP" throughout this disclosure. An enterprise network may also implement MPLS, Generic Route Encapsulation (GRE), Internet Protocol Security (IPsec), or another tunneling protocol, and may alternatively be referred to as an "MPLS/IP network."

Subscribers of the enterprise may request services, e.g., video, from a service provider. The subscribers expect that these services are provided by the service provider with an acceptable level of quality, commonly referred to as Quality of Experience (QoE). The QoE may be measured based on various parameters, including latency, delay (inter frame gap), jitter, packet loss, and throughput. The subscribers may define desired levels for one or more of the parameters for the QoE that the subscribers expect in service contracts, e.g., service level agreements, with the service provider.

SUMMARY

In general, techniques are described for selecting paths in a computer network in accordance with service level agreements. For example, in the case of a hub-and-spoke network, spoke and hub routers advertise routes associated with virtual routing and forwarding (VRF) instances mapped to service level agreements (SLAs). According to the disclosed techniques, a virtual route reflector of an intermediate router positioned between the spoke and hub routers receives route advertisements and adds respective path communities associated with particular paths selected based on link state measurements in accordance with the SLAs. The hub or spoke routers may receive the route advertisements including a respective path community and install the selected path as a next-hop for a given SLA. In this way, spoke and hub routers may forward traffic on links that satisfy particular SLAs such that Quality of Experience (QoE) for an application may be restored or improved.

The techniques described herein may also provide dynamic path switching. For example, a controller may select a new path if the current path experiences QoE degradation. According to the disclosed techniques, a controller continuously monitors link state measurements and determines whether a previously selected path has repeated violations of the given SLA. In response to determining that the previously selected path has repeated violations of the given SLA, the controller selects a new path for the given SLA. The controller then instructs the virtual route reflector of the intermediate router to add a path community associated with the new path to a route advertisement. In some examples, the controller may also be executed on the same intermediate router as the virtual router reflector.

In one example, a method includes receiving, by a virtual route reflector (VRR) executed on an intermediate router positioned between a hub router and a plurality of spoke routers in a hub-and-spoke network, a route advertisement including information identifying a virtual routing and forwarding (VRF) instance, wherein the VRF instance is mapped to a service level agreement (SLA). The method also includes adding, by the VRR and to the route advertisement, a path community that uniquely identifies a selected path along one of a plurality of links that satisfy the SLA, wherein the plurality of links is coupled to the hub router and the plurality of spoke routers. The method also includes sending, by the VRR to a destination router of the hub-and-spoke network, the route advertisement including the path community such that the destination router may install the selected path as a next-hop for the VRF instance.

In another example, a network device includes a memory; and one or more processors operably coupled to the memory, wherein the one or more processors are configured to: execute a virtual route reflector on the network device positioned between a hub router and plurality of spoke routers in a hub-and-spoke network; receive a route advertisement including information identifying a virtual routing and forwarding (VRF) instance, wherein the VRF instance is mapped to a service level agreement (SLA); add, to the route advertisement, a path community that uniquely identifies a selected path along one of a plurality of links that satisfy the SLA, wherein the plurality of links is coupled to the hub router and the plurality of spoke routers; and send, to a destination router of the hub-and-spoke network, the route advertisement including the path community such that the destination router may install the selected path as a next-hop for the VRF instance.

The details of one or more examples are set forth in the accompanying drawings and the description below. Other features, objects, and advantages will be apparent from the description and drawings, and from the claims.

BRIEF DESCRIPTION OF DRAWINGS

Like reference characters denote like elements throughout the figures and text.

DETAILED DESCRIPTION

Figure 1:
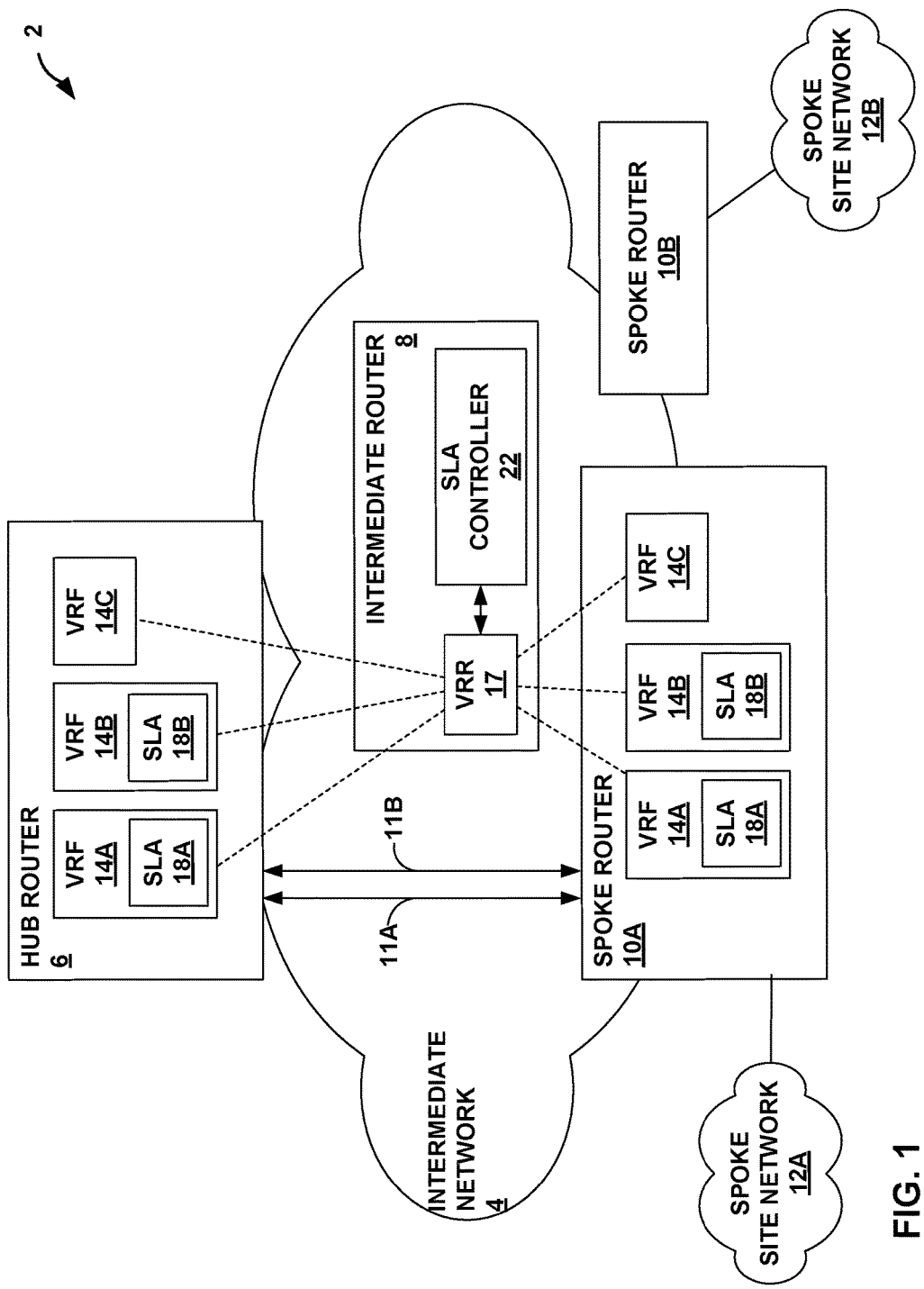
FIG. 1 is a block diagram illustrating an example system, in accordance with the techniques described in this disclosure.

FIG. 1 is a block diagram illustrating an example network system 2 for selecting paths in accordance with service level agreements (SLAs), in accordance with the techniques described in this disclosure. In the example of FIG. 1, system 2 may be configured in a hub-and-spoke topology to provide packet-based network services to subscriber devices (not shown). System 2 may in some examples be a regional data center of a service provider's Cloud Service Orchestration (CSO) space that may request and receive delivery of a defined service. Although described with respect to "subscribers" that connote end-users of an enterprise network, the techniques described herein are similarly applicable to "customers" of the enterprise network and to customer devices such as cell towers, multi-tenant units (MTUs), residential aggregation points, and so forth. Examples of customers may include universities, businesses, or any other entities that purchase, lease, or otherwise use services provided by network system 2.

In the example of FIG. 1, system 2 includes spoke site networks 12A, 12B (collectively, "spoke networks 12") and intermediate network 4 that provide packet-based services that are available for request and use by subscriber devices. For example, spoke site networks 12 and intermediate network 4 may provide bulk data delivery, voice over Internet protocol (VoIP), Internet Protocol television (IPTV), Short Messaging Service (SMS), Wireless Application Protocol (WAP) service, or customer specific application services. Although system 2 may include any number of spoke site networks, FIG. 1, for simplicity, shows only spoke site networks 12A, 12B.

Spoke site networks 12 may each represent a geographically distributed site of an enterprise, e.g., a branch office, of intermediate network 4. Each of spoke site networks 12 may include one or more Local Area Networks (LANs) (not shown). Computing devices within spoke site networks 12 may represent one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. These computing devices may be a host, server, virtual machine, container, or other source or destination for L2 traffic.

Intermediate network 4 may be a service provider network that is owned and operated by a service provider, which is usually a large telecommunications entity or corporation. Intermediate network 4 may provide a number of residential and business services, including residential and business class data services (which are often referred to as "Internet services" in that these data services permit access to the collection of publicly accessible networks referred to as the Internet), residential and business class telephone and/or voice services, and residential and business class television services.

Intermediate network 4 may represent an L3 computer network, where reference to a layer followed by a number refers to a corresponding layer in the Open Systems Interconnection (OSI) model. Intermediate network 4 is an L3 network in the sense that it natively supports L3 operations as described in the OSI model. Common L3 operations include those performed in accordance with L3 protocols, such as the Internet protocol (IP). L3 is also known as a "network layer" in the Open Standards Interconnection model and the "IP layer" in the TCP/IP model, and the term L3 may be used interchangeably with the and "network layer" and "IP" throughout this disclosure. Intermediate network 4 may also implement Multiprotocol Label Switching (MPLS). Intermediate network 4 may also implement a tunneling protocol, such as Generic Route Encapsulation (GRE), Internet Protocol Security (IPsec), or the like. Intermediate network 12 may alternatively be referred to as an "MPLS/IP network."

Intermediate network 4 may comprise, for instance, a wide area network (WAN), the internet, a software-defined WAN (SD-WAN), an enterprise IP network, a layer 3 virtual private network (L3VPN), or some combination thereof. While described as an SD-WAN, intermediate network 4 may represent any network capable of transmitting traffic exchanged between network devices of an enterprise network.

Intermediate network 4 may comprise an autonomous system (AS). For example, intermediate network 4 may include a set of network devices that are under a single technical administration and generally use an interior communication protocol, e.g., Internal Border Gateway Protocol (IBGP), to advertise routing information within a set of network devices.

As shown in FIG. 1, hub router 6 facilitates communication between one or more spoke site networks, e.g., spoke site networks 12A, 12B, via a spoke routers 10A, 10B (collectively, "spoke routers 10"), respectively. For example, hub router 6 may be managed by a service provider to receive and send traffic to each connected spoke router, e.g., spoke routers 10.

Spoke routers 10 may each represent a gateway to respective branch offices, e.g., spoke site networks 12. Spoke routers 10 may each connect to intermediate network 4 via one or more physical or logical interfaces (not shown) of spoke routers 10. Network interface cards of spoke routers 10 may provide the physical or logical interfaces. Access links 11A, 11B (collectively, "access links 11") may correspond to a physical or logical interface of spoke routers 10 and may connect spoke routers 10 to hub router 6. Access links 11 may be Point-to-Point Protocol (PPP) links, Asynchronous Transfer Mode (ATM) links, Ethernet links, Frame Relay links, or other WAN links.

In the example of FIG. 1, hub router 6 and spoke routers 10 may establish an overlay network in which links 11 are "overlaid" using a tunneling protocol, e.g., GRE. In such overlay networks, traffic is carried between hub router 6 and spoke routers 10 with GRE as the carrier protocol and Internet Protocol version 4 (IPv4) or Internet Protocol version 6 (IPv6) as the transport protocol, for example.

Hub router 6 and spoke routers 10 may each implement multiple virtual routing and forwarding (VRF) instances, e.g., VRF 14A-14C (collectively, "VRFs 14"). Each of VRFs 14 represents a virtual routing and forwarding instance that allows traffic on a single physical interface to be differentiated and associated with multiple virtual routers. As further described below, each of VRFs 14 are mapped to a particular service level agreement (SLA).

Subscribers within spoke site networks 12 of the enterprise may request services, e.g., video, from a service provider. The subscribers expect that these services are provided with an acceptable level of quality, commonly referred to as Quality of Experience (QoE). The QoE may be measured based on various parameters, including latency, delay (inter frame gap), jitter, packet loss, and throughput. The subscribers may define desired levels for one or more of the parameters for the QoE that the subscribers expect in service contracts, e.g., service level agreements 18A, 18B (collectively, "SLAs 18"), with the service provider. For example, a subscriber may define SLA 18A with an expected level of latency and SLA 18B with an expected level of packet loss. Additional information regarding SLA parameters is described in S. Bradner, et. al., "Benchmarking Methodology for Network Interconnect Devices, Network Working Group, RFC 2544, March 1999, the entire contents of which are incorporated by reference herein.

Each forwarding plane of spoke routers 10 may map specific SLAs to VRFs. In the example of FIG. 1, each of VRFs 14 of hub router 6 and spoke router 10A may be mapped to a corresponding SLA, e.g., SLA 18A, 18B. For example, SLA 18A (e.g., latency) is mapped to VRF 14A, and SLA 18B (e.g., packet loss) is mapped to VRF 14B. A default VRF, e.g., VRF 14C, may represent a "backup" VRF instance that is used when one of VRFs 14A, 14B fail. Although FIG. 1 is illustrated with only VRFs 14A-14C, any number of SLAs may be mapped to a corresponding number of VRF instances.

Each forwarding plane of spoke routers 10 may also map applications to the specific VRFs 14 using application-filter rules (e.g., Deep Packet Inspection (DPI) based on L3/L4 or higher layer protocol parameters or packet content) such that route lookup for traffic generated from a specific application occurs on a specific VRF 14.

In an autonomous system, e.g., intermediate network 4, hub router 6 and spoke routers 10 may advertise routes via IBGP, for example, for each VRF 14 instance. IBGP provides a means by which external BGP (EBGP) route advertisements can be forwarded throughout the network. An IBGP route, for example, includes an IP address prefix, and information that describes a path to the destination. For example, an IBGP route may include a loopback interface used to establish connections between IBGP peers, e.g., hub router 6 and spoke routers 10. Additional information regarding IBGP is described in "Internal BGP as the Provider/Customer Edge Protocol for BGP/MPLS IP Virtual Private Networks (VPNs)," Internet Engineering Task Force (IETF), RFC 6368, September 2011, the entire contents of which is incorporated by reference herein.

Within an autonomous system, e.g., intermediate network 4, all BGP-enabled routers run IBGP in a full-mesh to prevent forwarding loops. In such examples, route reflectors are typically used to simplify configuration for the IBGP full-mesh requirement. When using a route reflector, routers are grouped into clusters, which are identified by numeric identifiers unique to an autonomous system, e.g., intermediate network 4. Within the cluster, an IBGP session is configured from a single router, e.g., the route reflector, to each internal peer, e.g., hub router 6 and spoke routers 10. That is, rather than having all internal peers be fully meshed with each other, route reflection may have only the route reflector be fully meshed with all internal peers of the AS.

In the example of FIG. 1, an intermediate router 8 may be fully-meshed to hub router 6 and spoke routers 10. Intermediate router 8 executes a route reflector, e.g., Virtual Route Reflector 17 ("VRR 17") run in a virtualized environment. For example, intermediate router 8 may implement in its control plane a route reflector capability using a virtual machine. As illustrated in FIG. 1, intermediate router 8 executing VRR 17 resides along a path in intermediate network 4 between two or more routers, e.g., hub router 6 and spoke routers 10. VRR 17 may be a BGP route reflector, as described in T. Bates, "BGP Route Reflection—An Alternative to Full Mesh Internal BGP (IBGP)," Network Working Group RFC 4456, April 2006, the entire contents of which being incorporated by reference herein. That is, VRR 17 may re-advertise routes learned from an internal peer to other internal peers. For example, VRR 17 re-advertises network layer reachability information (NLRI) received from spoke routers 10 to hub router 6, and VRR 17 re-advertises NLRI received from hub router 6 to spoke routers 10. To advertise routes, hub router 6 and spoke routers 10 may each establish an IBGP session with VRR 17. Although illustrated with a single virtual route reflector, system 2 may include a plurality of virtual route reflectors executed in the same intermediate router 8 or in other intermediate routers or network devices within the AS of intermediate network 4.

In accordance with techniques of this disclosure, an SLA controller 22 is configured to select paths in accordance with one or more SLA parameters, and instruct VRR 17 to add a unique path community associated with the selected path. For example, spoke routers 10 and hub router 6 may advertise routes for each of VRFs 14 to VRR 17, which may add respective path communities to the route advertisements before reflecting the route advertisements to their destination.

For example, spoke router 10A may advertise "N" route advertisements, wherein "N" represents the number of VRFs 14. In the example of FIG. 1, spoke router 10A may advertise three routes to VRR 17; a route for VRFs 14A, 14B and a route for default VRF 14C. The advertised routes may each be a BGP update message used to transfer routing information. That is, the BGP update message is used to advertise routes that share common path attributes to an internal peer. Additional information regarding BGP messages is described in Y. Rekhter, et. al., "A Border Gateway Protocol 4 (BGP-4)," Network Working Group, RFC 4271, January 2006, the entire contents of which are hereby incorporated by reference herein.

Each route advertisement may include a unique route distinguisher (RD) and a unique BGP extended community associated with a respective VRF 14. A route distinguisher is a unique identifier used to create distinct routes to the same network device. For example, each of VRF instances, e.g., VRFs 14A, 14B and default VRF 14C, has a respective route distinguisher that uniquely identifies the corresponding VRF. In this way, the same network address prefixes can be used with different VRF instances. Additional information regarding route distinguishers is described in E. Rosen, et. al., "BGP/MPLS IP Virtual Private Networks (VPNs)," Network Working Group, RFC 4364, February 2006, the entire contents of which are hereby incorporated by reference herein.

The BGP extended community is used to filter route advertisements for VRF instances. That is, the BGP extended community may control which routing information a router, e.g., hub router 6 or spoke routers 10, accepts or distributes to its peers. Additional information regarding BGP communities is described in S. Sangli, et. al., "BGP Extended Communities Attribute," Network Working Group, RFC 4360, February 2006, the entire contents of which are hereby incorporated by reference herein.

As one example, spoke router 10A may advertise in each of the routes for VRFs 14 an IP prefix, e.g., a subnet used to identify all the network devices within spoke site network 12A. Each route advertisement may include a unique RD and a unique BGP extended community associated with a respective VRF 14. For example, a route advertisement for VRF 14A may include an RD and an BGP extended community that uniquely identifies VRF 14A, and a route advertisement for VRF 14B may include a different RD and BGP extended community that uniquely identifies VRF 14B. In some examples, spoke router 10A may advertise a route for default VRF 14C ("default route 14C") with a local-address of spoke router 10A. The default route may also include a different RD and BGP extended community that uniquely identifies default VRF 14C.

Spoke router 10A may establish an IBGP session with VRR 17. As such, VRR 17 receives the routes from spoke router 10A and may add a link specific community (referred to herein as "path community") to each of the route advertisements before reflecting the routes to hub router 6. Each path community may identify a specific path along one of links 11 that satisfies a given SLA. As further described below, a controller, e.g., SLA controller 22, may select a path and instruct VRR 17 to add a unique path community associated with the selected path. A destination network device that receives the route advertisement including the path community may therefore install the selected path for which the destination device, e.g., hub router 6, should forward traffic.

In the illustrated example of FIG. 1, SLA controller 22 is executed on intermediate router 8 along with VRR 17. In other examples, SLA controller 22 may be executed on another intermediate router or network device included in the AS of intermediate network 4. In still other examples, SLA controller 22 may operate as a stand-alone network device within the AS of intermediate network 4. In any of these examples, SLA controller 22 remains communicatively coupled, e.g., by IBGP, to VRR 17.

SLA controller 22 may perform link state measurements on links 11, including latency, delay, jitter, packet loss, and throughput. For example, SLA controller 22 may implement operations, administration, and management (OAM) techniques, such as Connectivity Fault Management (CFM) as described in the Institute of Electrical and Electronics Engineers (IEEE) 802.1ag and International Telecommunications Union Telecommunications Standardization Sector Y.1731, entitled "OAM functions and mechanisms for Ethernet based networks," dated May 2006, herein incorporated by reference. SLA controller 22 may send and receive OAM packets to determine whether one or more links 11 satisfies a given SLA 18. SLA controller 22 may then select a path along the one or more links that satisfies the given SLA 18 and instruct VRR 17 to add a unique path community associated with a selected path to the route advertisements received from spoke router 10A.

In one instance, SLA controller 22 may measure latency of links 11. SLA controller 22 may measure a latency of 25 milliseconds (ms) for link 11A and a latency of 36 ms for link 11B. SLA controller 22 may determine that link 11A satisfies SLA 18A in which a subscriber has defined a desired latency of less than 30 ms. In response, SLA controller 22 may instruct VRR 17 to add a path community associated with link 11A to the route advertisement for VRF 14A before reflecting the route to hub router 6. In another instance, SLA controller 22 may measure packet loss of links 11. SLA controller 22 may measure a packet loss of 5% for link 11A and a packet loss of 3% for link 11B. SLA controller 22 may determine that link 11B satisfies SLA 18B in which a subscriber has defined a desired packet loss of less than 5%. In response, SLA controller 22 may instruct VRR 17 to add a path community associated with link 11B to the route advertisement for VRF 14B before reflecting the route to hub router 6.

In some examples, SLA controller 22 may also instruct VRR 17 to add a path community associated with all links, e.g., links 11A, 11B, to the default route for default VRF 14C before reflecting the default route to hub router 6.

In some examples, SLA controller 22 may include techniques for dynamic path switching. As further described below, SLA controller 22 may select a new path if the path previously selected for the given SLA 18 has experienced QoE degradation. That is, the previously selected path along a link may experience repeated violations of the given SLA 18. For example, SLA controller 22 may continuously monitor link state measurements and determine whether a previously selected path has repeated violations of the given SLA 18. In response to determining that the previously selected path has repeated violations of the given SLA 18, SLA controller 22 may select a new path for the given SLA 18.

In one instance, SLA controller 22 may continuously monitor link 11A for repeated latency violations of SLA 18A. In some examples, SLA controller 22 may define a threshold number of violations that when exceeded, SLA controller 22 may select a new path that satisfies SLA 18A. If the current violation for link 11A exceeds the threshold number of violations, SLA controller 22 may select an alternate path (e.g., link 11B) that satisfies SLA 18A. In some example, if no alternative link is available, SLA controller 22 may generate a QoE error message and continue to utilize link 11A. In some examples, if more than one link satisfies the SLA 18A (e.g., 11B and link 11C not shown), SLA controller 22 may select the link that is the least loaded, i.e., the link that satisfies the least number of SLAs 18. For example, link 11B may only satisfy SLA 18A, whereas link 11C may satisfy SLA 18A and SLA 18B. Since both links satisfy SLA 18A, SLA controller 22 may select link 11B because link 11B has the least load.

Hub router 6 may receive the route advertisements including their respective path communities reflected from VRR 17 and may import these routes into corresponding forwarding tables, where each table corresponds to VRFs 14A, 14B and default VRF 14C. For example, hub router 6 imports a route that is advertised from VRF 14A of spoke router 10A in a forwarding table associated with VRF 14A of hub router 6, a route that is advertised from VRF 14B in spoke router 10A is imported in a forwarding table associated with VRF 14B of hub router 6, and a default route that is advertised from default VRF 14C in spoke router 10A is imported in a forwarding table associated with default VRF 14C of hub router 6.

Hub router may also install a specific path along one of links 11 for each of VRFs 14 based on the respective path communities included with the route advertisements. Continuing the example above, based on the path community, hub router 6 may install a path along link 11A as a next-hop for SLA 14A. In this way, traffic generated by an application may be forwarded on link 11A for SLA 14A such that the traffic is delivered on a selected path that satisfies the desired latency as defined in SLA 18A.

In some examples, hub router 6 may also install routes with all paths for default VRF 14C in case of a failure to one of the paths installed for each of VRFs 14A, 14B. For example, hub router 6 may install a default route for VRF 14A such that if the primary path (e.g., link 11A) for VRF 14A fails, hub router 6 may forward traffic along any available path via default VRF 14C (e.g., link 11B).

Hub router 6 may also advertise "N" route advertisements, wherein "N" represents the number of VRFs 14. For example, hub router 6 may advertise three routes to spoke router 10A; a route for VRFs 14A, 14B and a route for default VRF 14C. As hub router 6 is by default a next-hop for all spoke routers 10, hub router 6 may advertise default summary routes, e.g., 0.0.0.0/0, for each of VRFs 14, using a next-hop address of hub router 6. Each default summary route may also include a unique RD and unique BGP extended community associated with a respective VRF 14. In some examples, hub router 6 may advertise a default route for default VRF 14C with a local-address of hub router 6. The default route may include an RD and BGP extended community that uniquely identifies default VRF 14C.

Hub router 6 may establish an IBGP session with VRR 17. As such, VRR 17 may receive the route advertisements from hub router 6 and may add path communities to each of the default summary routes before reflecting the routes to spoke routers 10. As described above, SLA controller 22 may determine whether one or more links 11 satisfies a given SLA and may select a path along the link that satisfies the given SLA. SLA controller 22 may instruct VRR 17 to add a unique path community associated with the selected path to the route advertisements received from hub router 6. VRR 17 may then reflect the default summary routes including their respective path communities to spoke router 10A.

Spoke router 10A may receive the default summary routes including their respective path communities from VRR 17 and may import these route advertisements into corresponding tables, where each table corresponds to VRFs 14A, 14B and default VRF 14C. For example, spoke router 10A may install a default summary route into VRF 14A and install a default summary route into VRF 14B.

Spoke router 10A may also install a specific path along one of links 11 for each of VRFs 14 based on the respective path communities included with the default summary routes. Continuing the example above, based on the path community, spoke router 10A may install a default route for VRF 14A with a path along link 11A, and a default route for VRF 14B with a path along link 11B.

In some examples, spoke router 10A may also install routes with all paths for default VRF 14C in case of a failure to one of the paths installed for each of VRFs 14A, 14B. For example, spoke router 10A may install a default route for VRF 14A such that if the primary path (e.g., link 11A) for VRF 14A fails, spoke router 10A may forward traffic along the available paths in default VRF 14C (e.g., link 11B).

In this way, network system 2 may select a path in accordance with service level agreements such that hub router 6 and spoke routers 10 may forward traffic generated by an application on the selected path that satisfies a given SLA.

Figure 2A:
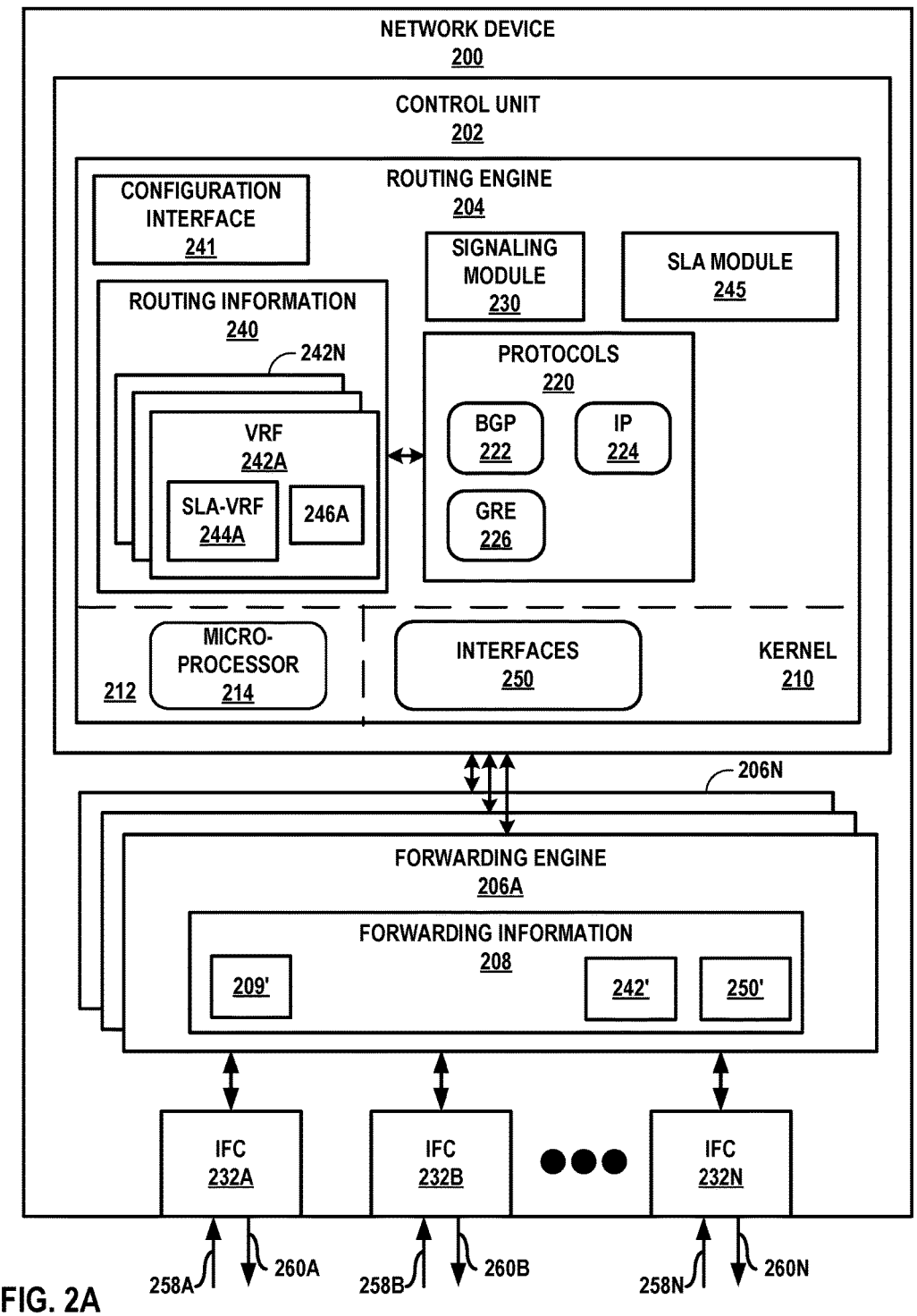
FIG. 2A is a block diagram illustrating an example network device, in accordance with the techniques described in this disclosure.

FIG. 2A is a block diagram illustrating an example network device, in accordance with techniques of the disclosure. Network device 200 may represent an example instance of hub router 6 or one of spoke routers 10 of FIG. 1.

Network device 200 includes a control unit 202 that includes a routing engine 204, and control unit 202 is coupled to forwarding engines 206A-206N ("forwarding engines 206" or "forwarding units 206"). Each of forwarding engines 206 is associated with one or more of interface cards 232A-232N ("IFCs 232") that receive packets via inbound links 258A-258N ("inbound links 258") and send packets via outbound links 260A-260N ("outbound links 260"). IFCs 232 are typically coupled to links 258, 260 via a number of interface ports (not shown). Interfaces for inbound links 258 and outbound links 260 may represent physical interfaces, logical interfaces, or some combination thereof. Interfaces for links 258, 260 may represent local interfaces of network device 200 for links for one or more GRE overlay links of a network, e.g., links 11 of FIG. 1.

Elements of control unit 202 and forwarding engines 206 may be implemented solely in software, or hardware, or may be implemented as combinations of software, hardware, or firmware. For example, control unit 202 may include one or more processors, one or more microprocessors, digital signal processors (DSPs), application specific integrated circuits (ASICs), field programmable gate arrays (FPGAs), or any other equivalent integrated or discrete logic circuitry, or any combination thereof, which execute software instructions. In that case, the various software modules of control unit 202 may comprise executable instructions stored, embodied, or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable storage media may include random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, a solid state drive, magnetic media, optical media, or other computer-readable media. Computer-readable media may be encoded with instructions corresponding to various aspects of network device 200, e.g., protocols. Control unit 202, in some examples, retrieves and executes the instructions from memory for these aspects.

Routing engine 204 includes kernel 210, which provides a run-time operating environment for user-level processes. Kernel 210 may represent, for example, a UNIX operating system derivative such as Linux or Berkeley Software Distribution (BSD). Kernel 210 offers libraries and drivers by which user-level processes may interact with the underlying system. Hardware environment 212 of routing engine 204 includes microprocessor 214 that executes program instructions loaded into a main memory (not shown in FIG. 2A) from a storage device (also not shown in FIG. 2A) in order to execute the software stack, including both kernel 210 and processes executing on the operating environment provided by kernel 210. Microprocessor 214 may represent one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

In the example of FIG. 2, routing engine 204 may execute various protocols 220 at different layers of a network stack. Network protocols may include Border Gateway Protocol (BGP) 222 and Internet Protocol (IP) 224. Protocols 220 may also include a tunneling protocol, such as a Generic Routing Encapsulation protocol 226 based on D. Farinacci, et. al., "Generic Routing Encapsulation (GRE)," Network Working Group, RFC 2784, March 2000, which is incorporated by reference herein. Protocols 220 may include other protocols not shown, such as an MPLS label distribution protocol and/or other MPLS protocols, or IP Security (IPsec) protocol based on S. Kent, et. al., "Security Architecture for the Internet Protocol," Network Working Group, RFC 4301, December 2005, which is incorporated by reference herein.

Routing engine 204 is responsible for the maintenance of routing information 240 to reflect the current topology of a network and other network entities to which network device 200 is connected. In particular, routing protocols periodically update routing information 240 to accurately reflect the topology of the network and other entities based on routing protocol messages received by network device 200.

Kernel 210 includes an interfaces table 250 ("interfaces 250") that represents a data structure that includes a corresponding entry for each logical interface configured for network device 200. Logical interfaces may correspond to local interfaces of network device 200 for VRFs 14 of FIG. 1. Entries for respective logical interfaces may specify respective current information describing the logical interfaces.

As shown in FIG. 2A, network device 200 may be configured with multiple VRFs 242A-242N ("VRFs 242"). Each of VRFs 242 represents a virtual routing and forwarding instance. VRF 242A includes at least one routing table for BGP 222 to store routes 246A. SLA-VRF 244A, for instance, may represent a virtual routing and forwarding table of VRF 242A for a given SLA. An attachment circuit may be associated with a particular VRF, such as VRF 242A, and the particular VRF may be configured to forward traffic for the attachment circuit. Routing information 240 may store routes for different routing tables using suitable data structures, such as a set, list, and/or database.

Signaling module 230 outputs control plane messages to automatically establish tunnels to interconnect multiple network devices including network device 200. Signaling module 230 may signal the network devices using one or more suitable tunnel signaling protocols, such as GRE 226 and/or MPLS protocols. Signaling module 230 can communicate with one of forwarding engines 206 to automatically update forwarding information 208.

Routing engine 204 includes an SLA module 245 that may maintain SLA-VRFs 244 for each SLA parameter defined by a customer. SLA module 245 may detect an SLA and map the SLA to a VRF instance, e.g., SLA-VRF 244A. SLA module 245 may also configure a route advertisement including a route distinguisher and BGP extended community associated with a respective SLA-VRF 244. Network device 200 may advertise the configured routes using BGP 222 to other network devices within the enterprise, e.g., intermediate network 4.

Routing engine 204 also includes a configuration interface 241 that receives and may report configuration data for network device 200. Configuration interface 241 may represent a command line interface; a graphical user interface; Simple Network Management Protocol (SNMP), Netconf, or another configuration protocol; or some combination of the above in some examples. Configuration interface 241 receives configuration data configuring the network device with VRFs 242, interfaces 250, and other constructs that at least partially define the operations for network device 200. Network device 200 may store configuration data to a storage device (not shown).

Forwarding engines 206 represent hardware and logic functions that provide high-speed forwarding of network traffic. Forwarding engines 206 typically includes a set of one or more forwarding chips programmed with forwarding information 208 that maps network destinations with specific next hops and the corresponding output interface ports 260. In general, when network device 200 receives a packet via one of inbound links 258, one of forwarding engines 206 identifies an associated next hop for the data packet by traversing the programmed forwarding information 208 based on information within the packet. For example, routing engine 204 analyzes routing information 240 and generates forwarding information 208 in accordance with routing information 240. In particular, kernel 210 may generate forwarding information 208, in accordance with information 240, to include representation of information stored to VRFs 242 and interfaces 250 in the form of forwarding information 242' and 250' for optimized forwarding by forwarding engines 206. Forwarding information 208 may be maintained in the form of one or more tables, link lists, radix trees, databases, flat files, or any other data structures. Routing information 240 includes routes 246A.

Figure 2B:
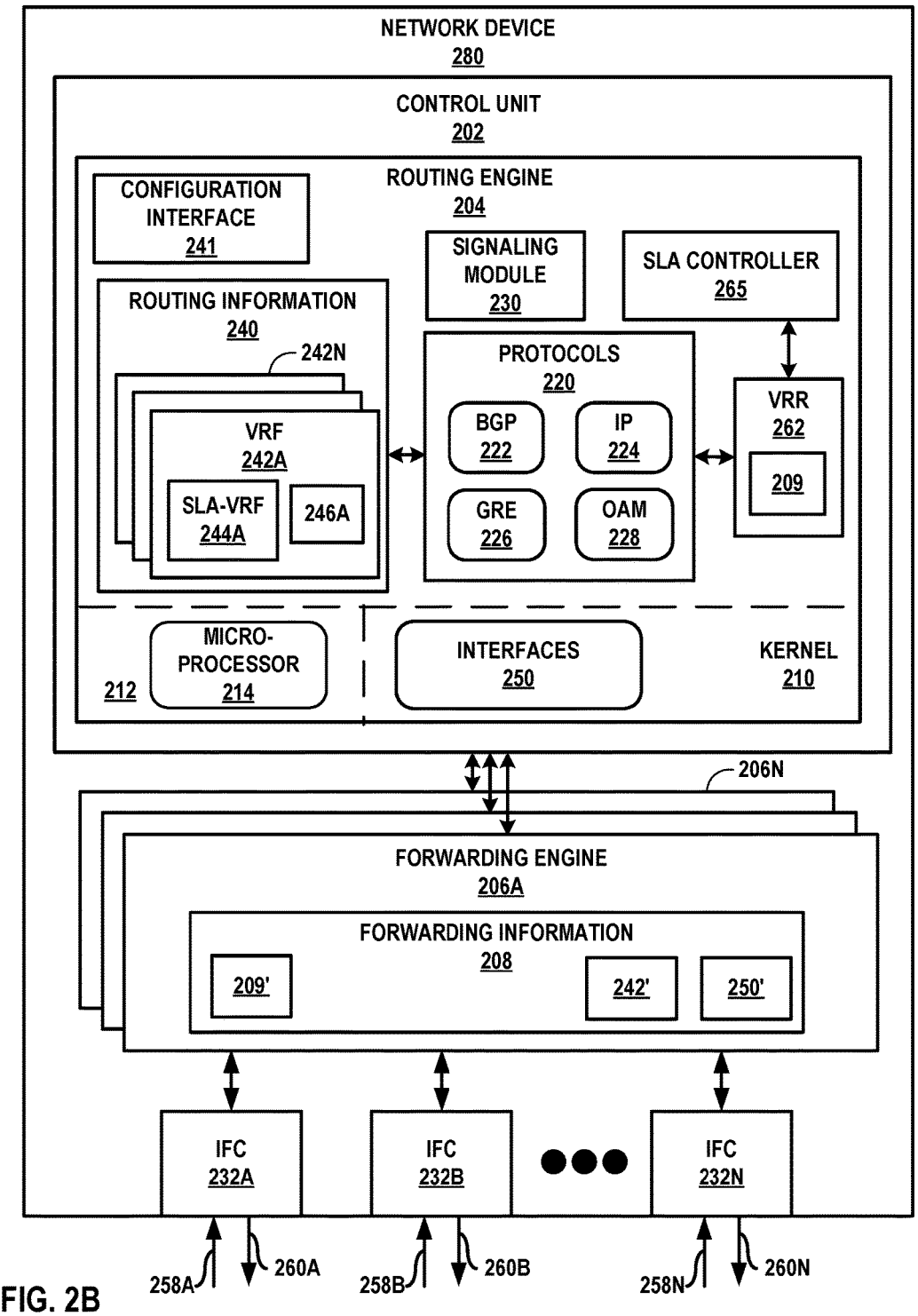
FIG. 2B is a block diagram illustrating another example network device, in accordance with the techniques described in this disclosure.

In accordance with the techniques described herein, forwarding information 208 may include path information 209' based on path communities received from a virtual route reflector as further described in FIG. 2B. Forwarding engine 206A forwards the data packet on one of outbound links 260 to the corresponding next hop along a selected path identified by path information 209' in accordance with forwarding information 208. For example, forwarding engine 206A may map applications to the specific VRFs 242 using application-filter rules (e.g., Deep Packet Inspection (DPI) based on L3/L4 or higher layer protocol parameters or packet content) such that route lookup for traffic generated from a specific application occurs on a specific SLA-VRF 244. Forwarding engine 206A may then forward the traffic for SLA-VRF 244 along a particular path based on path information 209'.

FIG. 2B is a block diagram illustrating another example network device, in accordance with techniques of the disclosure. Network device 280 of FIG. 2B is similar to network device 200 of FIG. 2A except as described below.

In the example of FIG. 2B, network device 280 may represent intermediate router 8 of FIG. 1. In this example, network device 280 may include a virtual route reflector 262 ("VRR 262") that may be a route reflector implemented in a virtualized environment, e.g., a virtual machine (not shown). VRR 262 may receive route advertisements and re-advertise routes learned from an internal peer to other internal peers of intermediate network 4. For example, VRR 262 may implement BGP protocol 222 to establish IBGP sessions with other network devices, e.g., hub router 6 and spoke routers 10, to receive and send routes. In particular, VRR 262 can re-advertise network layer reachability information (NLRI) received from one network device to another.

In the illustrated example of FIG. 2B, network device 280 also executes an SLA controller 265. VRR 262 may add, to a received route advertisement, a path community 209 that uniquely identifies a specific path selected by SLA controller 265 that satisfies a given SLA. As further described with respect to FIG. 3 below, SLA controller 265 may perform link state measurements on one or more links associated with network device 200 of FIG. 2A, and select a path along the one or more links that satisfies the given SLA. For example, SLA controller 265 may execute OAM protocol 228 to send and receive OAM packets to measure parameters including, e.g., latency, delay, jitter, packet loss, and throughput, on the links. Based on the link state measurements, SLA controller 265 may select a path along the one or more links that satisfy the given SLA and instruct VRR 262 to add a path community 209 that uniquely identifies the selected path to the received route advertisements. VRR 262 may then reflect the route advertisements including their respective path communities 209 to the destination network device such that the destination network device, e.g., network device 280 of FIG. 2A, may install the path community in the form of path information 209' for forwarding data along the selected path by forwarding engines 206.

Figure 3:
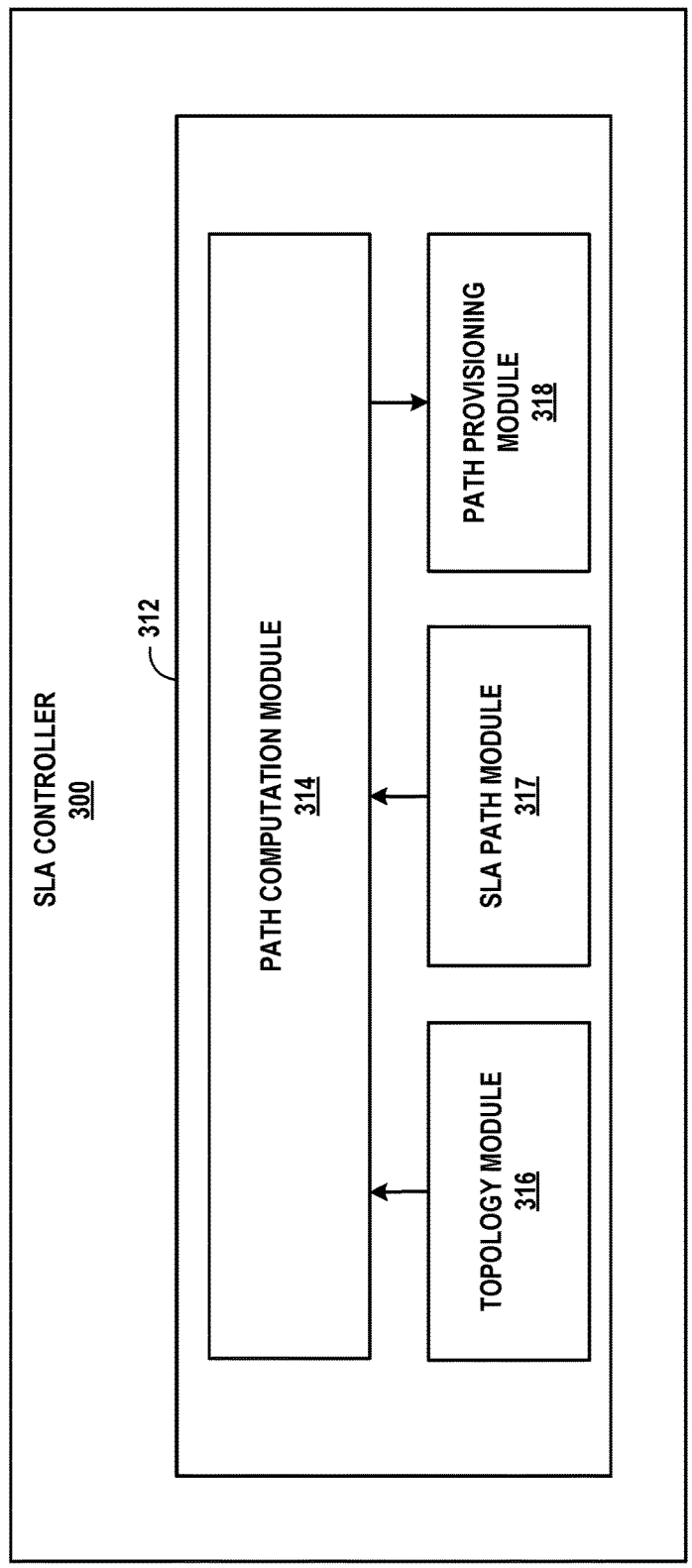
FIG. 3 is a block diagram illustrating a Service Level Agreement (SLA) controller that may select paths that satisfy SLAs based on link state measurements, according with the techniques described in this disclosure.

FIG. 3 is a block diagram illustrating an example SLA controller that may select paths that satisfy SLAs based on link state measurements, in accordance with the techniques described in this disclosure. In the example of FIG. 3, SLA controller 300 may represent an example instance of SLA controller 22 of FIG. 1 or SLA controller 265 of FIG. 2B. In other examples, SLA controller 300 may represent a standalone network device.

SLA controller 300 may perform link state measurements on links associated with a network device (e.g., hub router 6 or spoke routers 10 of FIG. 1), select a path along one or more links that satisfy a given SLA, and instruct a virtual route reflector to add a path community identifying the selected path to routes advertised from a network device. SLA controller 300 may comprise a server or network controller, for example. In some examples, SLA controller 300 may be implemented by control unit 202 of network device 280 that is coupled to IFCs 232 to exchange packets with other network devices by any of inbound links 258 and outbound links 260.

Path computation element 312 may establish paths between endpoints over the path computation domain. Paths may be requested based on various SLAs. That is, path computation element 312 may select a path that satisfies a given SLA.

To intelligently compute paths through the path computation domain, path computation element 312 includes topology module 316 and SLA path module 317. Topology module 316 may receive topology information describing available resources of the path computation domain, including access, aggregation, and edge nodes, interfaces thereof, and interconnecting communication links.

Topology module 316 handles topology discovery and, where needed, maintains control channels between path computation module 312 and nodes of the path computation domain. Topology module 316 may include an interface to describe received topologies to path computation module 314. Topology module 316 may use a topology discovery protocol to describe the path computation domain topology to path computation module 314. In one example, using a cloud control protocol mechanism for topology discovery, topology module 316 may receive a list of node neighbors, with each neighbor including a node identifier, local port index, and remote port index, as well as a list of link attributes each specifying a port index, bandwidth, expected time to transmit, shared link group, and fate shared group, for instance.

Topology module 316 may communicate with a topology server, such as a virtual route reflector (e.g., VRR 262 of FIG. 2B), to receive topology information for a network layer of the network. Topology module 316 may include a routing protocol process that executes a routing protocol to receive routing protocol advertisements, such as Open Shortest Path First (OSPF) or Intermediate System-to-Intermediate System (IS-IS) link state advertisements (LSAs) or Border Gateway Protocol (BGP) UPDATE messages. Topology module 316 may in some instances be a passive listener that neither forwards nor originates routing protocol advertisements. In some instances, topology module 316 may alternatively, or additionally, execute a topology discovery mechanism such as an interface for an Application-Layer Traffic Optimization (ALTO) service. Topology module 316 may therefore receive a digest of topology information collected by a topology server, e.g., an ALTO server, rather than executing a routing protocol to receive routing protocol advertisements directly.

SLA path module 317 may perform link state measurements on the interconnecting communication links, select a path along one or more of the interconnecting communication links that satisfy a given SLA parameter, and provide the selected path to path computation module 314. For example, SLA path module 317 may implement OAM techniques to measure, e.g., latency, delay, jitter, packet loss, and throughput on one or more links of a network device. Based on the link state measurements, SLA path module 317 may determine whether one or more links satisfies a given SLA. SLA path module 317 may select one or more links that satisfies the given SLA as the path for which a network device forwards traffic. SLA path module 317 may include an interface to describe link state measurements and selected paths to path computation module 314.

For example, SLA path module 317 may send OAM packets along links 11. SLA path module 317 may receive responses to OAM packets to measure, e.g., latency, delay, jitter, packet loss, and throughput. In some examples, SLA path module 317 may include a traffic engineering database (TED) (not shown) that stores the link state measurements, the number of SLAs currently used by a link, the number of violations of SLAs, an ordered list of SLAs based on priority, or other information associated with the SLAs. SLA path module 317 may retrieve information from the TED to compare the link state measurements with a given SLA to determine whether the link violates the given SLA. In response, SLA path module 317 may select a path along the link that satisfies the given SLA.

In some examples, SLA path module 317 may include techniques for dynamic path switching. That is, SLA path module 317 may select a new path if the path previously selected for the given SLA has repeated violations of the given SLA. For example, SLA path module 317 may continuously monitor link state measurements and determine whether a previously selected path has repeated violations of the given SLA. SLA path module 317 may include a counter, e.g., stored within the TED, to monitor the number of instances a link along the previously selected path violates the given SLA. In one instance, referring to FIG. 1, link 11A is selected as a path for SLA 18A. SLA path module 317 may monitor any latency violations for link 11A. For example, SLA path module 317 may increment the counter for each latency measurement in violation of SLA 18A, and may decrement the counter for each measurement satisfying SLA 18A.

SLA path module 317 may configure a "fail count," e.g., a threshold number for the counter that triggers a new path selection when exceeded. If the fail count is exceeded, SLA path module 317 may reset the counter and select an alternate link if the alternate link meets SLA 18A. For example, SLA path module 317 may, for three consecutive measurement instances, measure latency of 35 ms, 38 ms, and 37 ms for link 11A. SLA path module 317 may determine that the number of latency violations for link 11A has exceeded the fail count. In response, SLA path module 317 may select a new path, e.g., along link 11B, for SLA 18A. In some examples in which no alternate link is available, SLA module 317 may generate a QoE violation error message and may continue using the previously selected path. In some examples where more than one link satisfies SLA 18A, SLA path module 317 may select an alternate link that is the least loaded, i.e., the link satisfying the least number of SLAs. For example, SLA path module 317 may retrieve from the TED the number of SLAs currently satisfied by each of the links and select the link satisfying the least number of SLAs.

In some examples, SLA path module 317 may configure a fail count for violations of a plurality of SLAs. That is, SLA path module 317 may trigger a new path selection if SLA path module 317 determines that link 11A, e.g., violates latency and packet loss, and may select a new path that violates the least amount of SLAs.

Path computation module 314 of path computation element 312 computes a selected path through the path computation domain. In general, to compute a selected path, path computation module 314 determines whether the selected path exists. If a selected path exists, SLA controller 300 may establish the path using path provisioning module 318. For example, path provisioning module 318 may instruct a virtual route reflector (e.g., VRR 262 of FIG. 2B) to add a path community 209 that identifies a selected path to a route advertisement.

Figure 4:
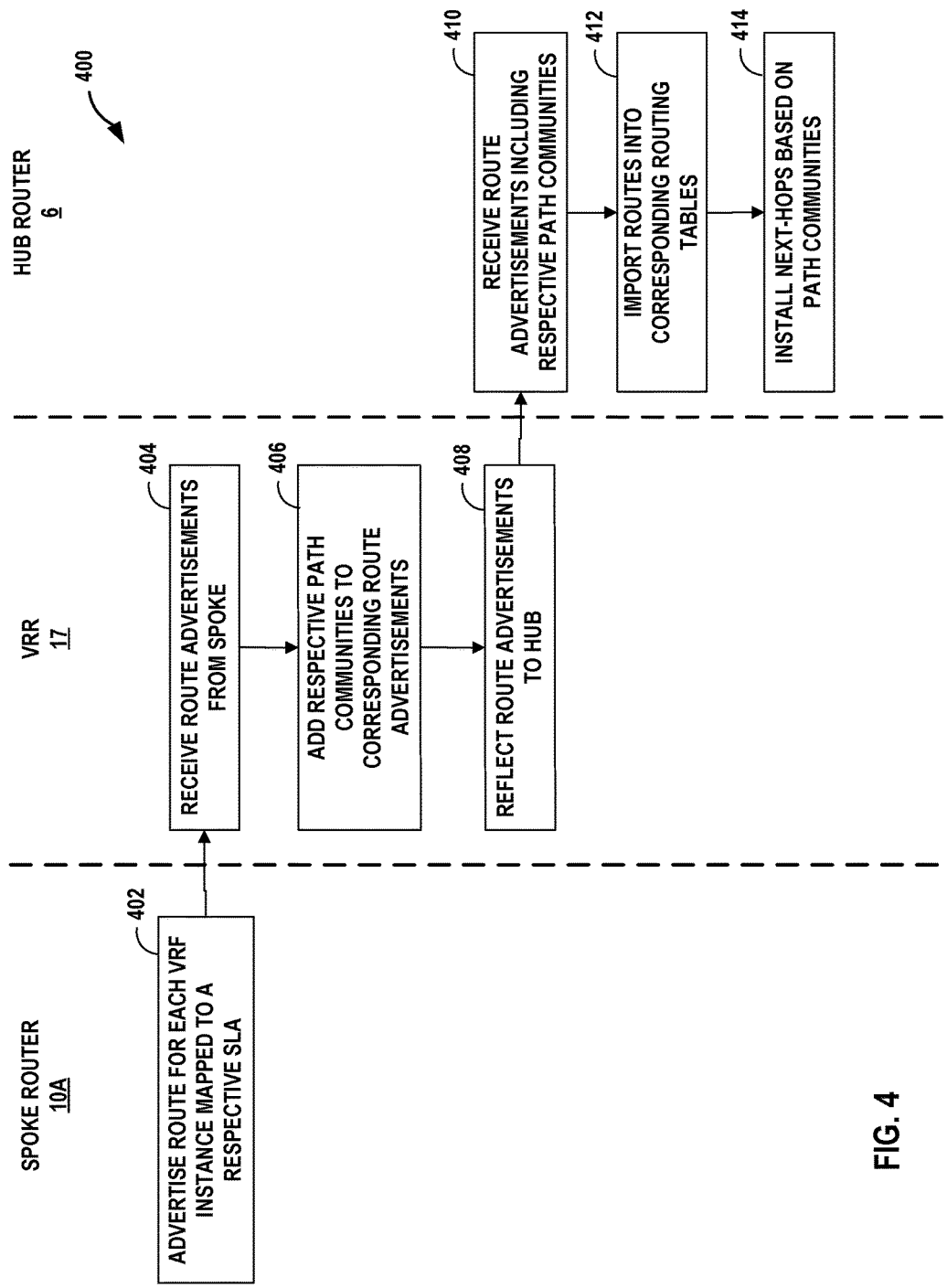
FIG. 4 is a flowchart illustrating an example mode of operation, in accordance with the techniques described in this disclosure.

FIG. 4 is a flowchart illustrating an example mode of operation, in accordance with techniques of this disclosure. Operation 400 is described with respect to spoke router 10A, hub router 6, and VRR 17 of FIG. 1.

Spoke router 10A may advertise a route for each VRF instance mapped to a respective SLA (402). Each of the route advertisements may include a respective RD and BGP extended community that uniquely identifies a corresponding VRF instance. For example, spoke router 10A may advertise a route including an RD and BGP extended community that uniquely identifies VRF 14A, which is mapped to SLA 18A (e.g., latency). Spoke router 10A may also advertise another route including a different RD and BGP extended community that uniquely identifies VRF 14B, which is mapped to SLA 18B (e.g., packet loss). Spoke router 10A may further advertise a route including an RD and BGP extended community that uniquely identifies default VRF 14C.

VRR 17 of intermediate router 8 may receive the route advertisements from spoke router 10A (404). VRR 17 may add respective path communities to corresponding route advertisements (406). For example, VRR 17 may receive a route advertisement for VRF 14A. As instructed by an SLA controller, VRR 17 may add a path community that identifies a path selected by the SLA controller for which hub router 6 should forward traffic for VRF 14A. VRR 17 may then reflect the route advertisements including the path communities to hub router 6 (408).

Hub router 6 may receive the route advertisements including respective path communities from VRR 17 (410). Hub router 6 may import the route advertisements into corresponding routing tables (412). For example, hub router 6 may import route advertisements based on the respective RD and BGP extended community. In one instance, hub router 6 may import a route advertisement for VRF 14A into a routing table for VRF 14A that is mapped to SLA 18A, and import a route advertisement for VRF 14B into a routing table for VRF 14B that is mapped to SLA 18B.

Hub router 6 may also install next-hops along one of links 11 based on the path communities included with the route advertisements (414). For example, the route advertisement for VRF 14A may include a path community identifying link 11A. In response, hub router 6 may install link 11A as a next-hop such that traffic forwarded from VRF 14A of hub router 6 may be forwarded along link 11A that satisfies SLA 18A.

Figure 5:
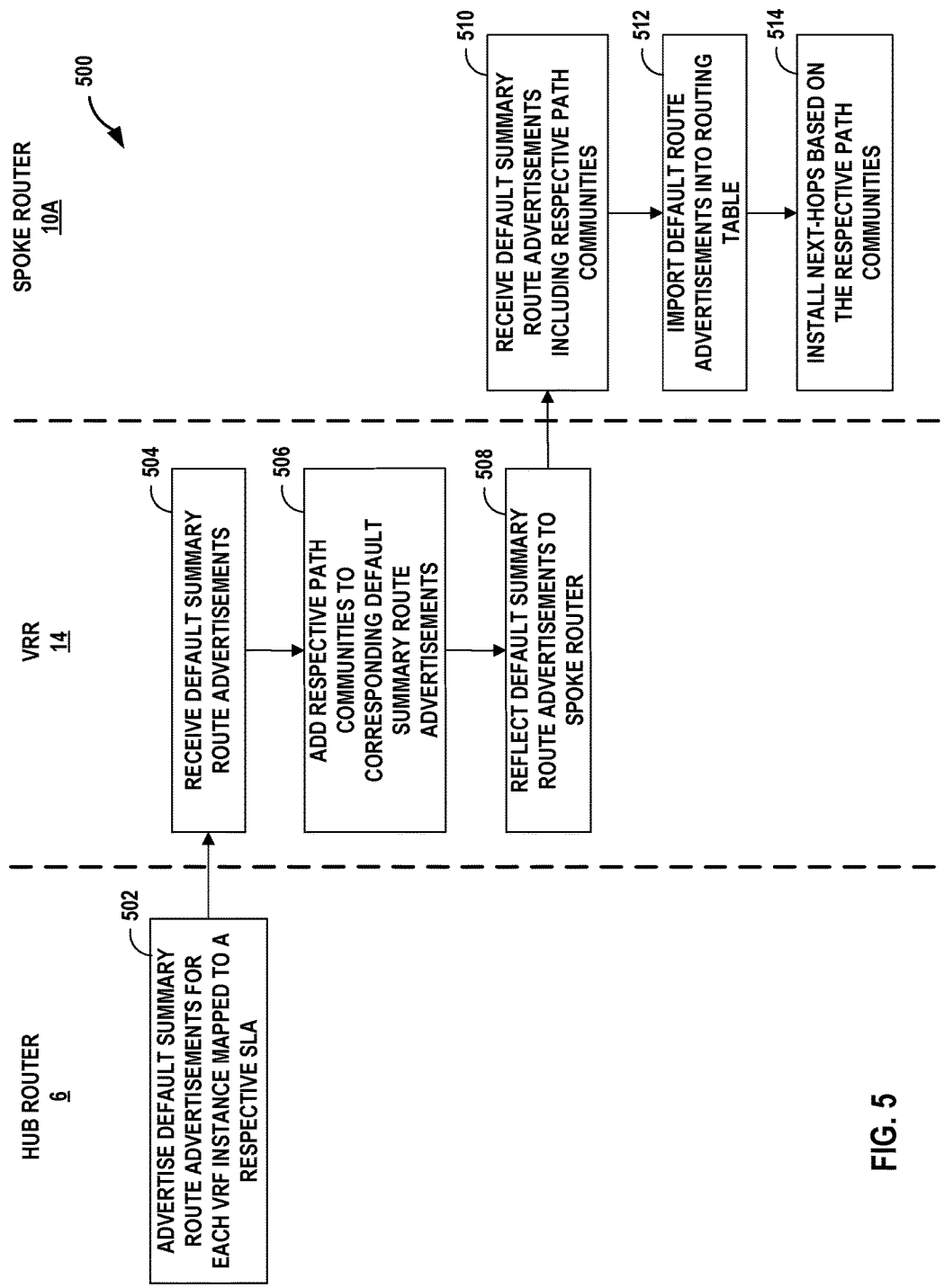
FIG. 5 is a flowchart illustrating another example mode of operation, in accordance with the techniques described in this disclosure.

FIG. 5 is a flowchart illustrating another example mode of operation, in accordance with techniques of this disclosure. Operation 500 is described with respect to spoke router 10A, hub router 6, and VRR 17 of FIG. 1.

Hub router 6 may advertise default summary route advertisements for each VRF instance mapped to a respective SLA (502). Each of the route advertisements may include a respective RD and BGP extended community that uniquely identifies a corresponding VRF instance. For example, hub router 6 may advertise a default summary route including an RD and BGP extended community that uniquely identifies VRF 14A, which is mapped to SLA 18A (e.g., latency). Hub router 6 may also advertise a default summary route including a different RD and BGP extended community that uniquely identifies VRF 14B, which is mapped to SLA 18B (e.g., packet loss). Hub router 6 may further advertise a default summary route including an RD and BGP extended community that uniquely identifies default VRF 14C.

VRR 17 of intermediate router 8 may receive the default summary route advertisements from hub router 6 (504). VRR 17 may add respective path communities to corresponding default summary route advertisements (506). For example, VRR 17 may receive a default summary route advertisement for VRF 14A. As instructed by an SLA controller, VRR 17 may add a path community to identify a path selected by the SLA controller for which spoke router 10A should forward traffic for VRF 14A. VRR 17 may then reflect the default summary route advertisements including their respective path communities to spoke router 10A (508).

Spoke router 10A may receive the default summary route advertisements including their respective path communities from VRR 17 (510). Spoke router 10A may import the default summary route advertisements into corresponding routing tables (512). For example, spoke router 10A may import route advertisements based on the respective RD and BGP extended community. In one instance, spoke router 10A may import a default summary route advertisement for VRF 14A into a routing table for VRF 14A that is mapped to SLA 18A, and import a default summary route advertisement for VRF 14B into a routing table for VRF 14B that is mapped to SLA 18B.

Spoke router 10A may also install next-hops along one of links 11 based on path communities included with the default summary route advertisements (514). For example, the default summary route advertisement for VRF 14A may include a path community identifying link 11A. In response, spoke router 10A may install link 11A as a next-hop such that traffic forwarded from VRF 14A of spoke router 10A may be forwarded along link 11A that satisfies SLA 18A.

Figure 6:
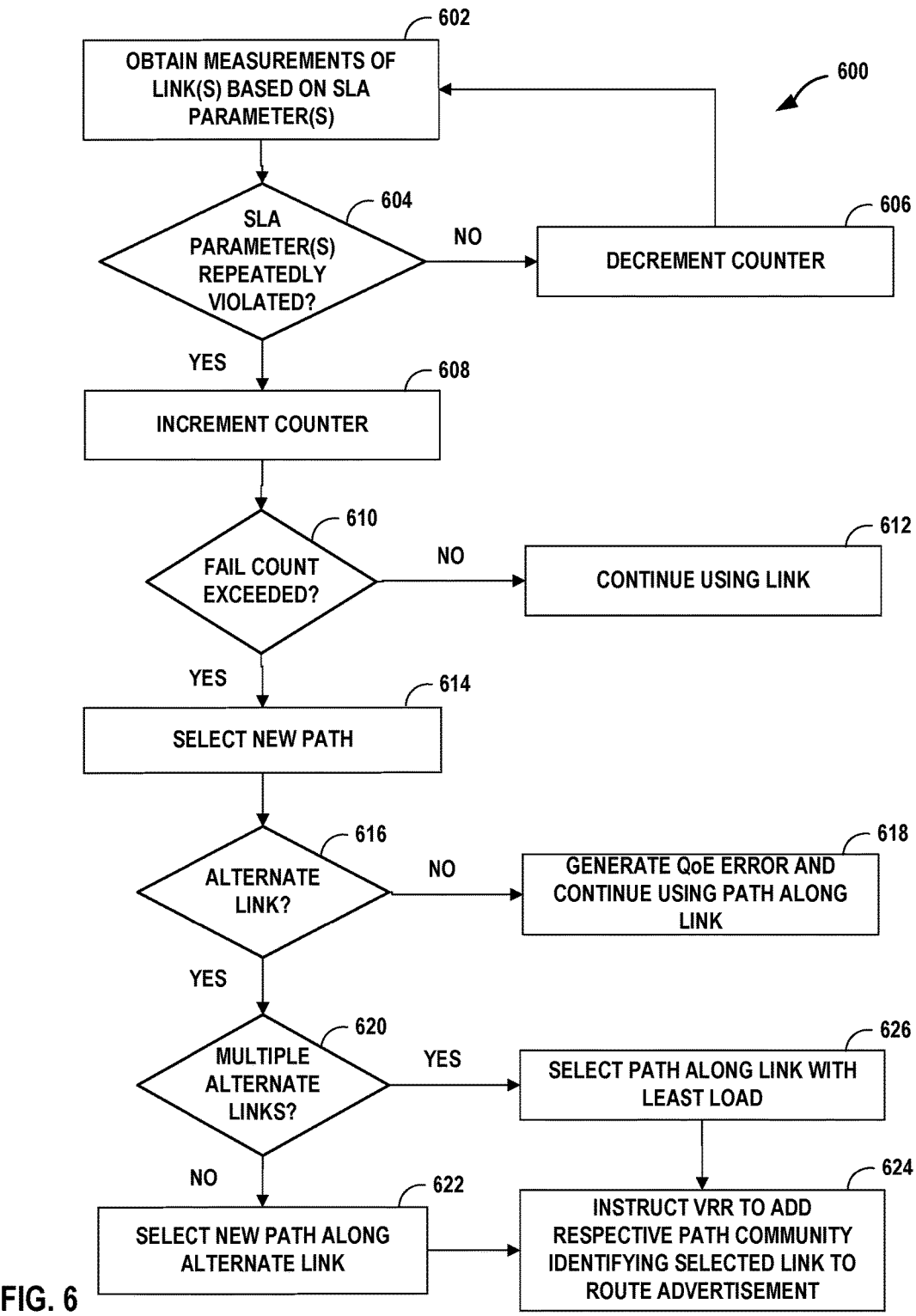
FIG. 6 is a flowchart illustrating a dynamic path switching operation, in accordance with the techniques described in this disclosure.

FIG. 6 is a flowchart illustrating an example dynamic path switching operation for an SLA controller, in accordance with techniques of this disclosure. FIG. 6 is described with respect to SLA controller 22 of FIG. 1 and SLA controller 300 of FIG. 3.

SLA controller 22 may obtain measurements of one or more links based on SLA parameters (602). For example, SLA controller 22 may send and receive OAM packets to obtain link state measurements of SLA parameters including, latency, delay, jitter, packet loss, and throughput. SLA controller 22 may determine from the link state measurements whether a particular link, e.g., link 11A, is repeatedly violating a given SLA parameter, e.g., SLA 18A (604). In one instance, SLA 18A specifies a desired latency of less than 30 ms. If in one instance, SLA controller 22 measures a latency of 25 ms for link 11A (NO branch of 604), SLA controller 22 may decrement a counter of SLA violations (606). If in another instance, SLA controller 22 measures a latency of 36 ms for link 11A (YES branch of 604), SLA controller 22 may increment the counter of SLA violations (608).

SLA controller 22 may then determine whether the SLA violation has exceeded a configured fail count (610). For example, a user may configure a threshold number of violations as three. If the counter of SLA violations does not exceed the fail count (NO branch of 610), SLA controller 22 may instruct VRR 17 to continue using the previously selected link (612).

If the counter of SLA violations exceeds the fail count (YES branch of 610), SLA controller 22 may select a new path (614). For example, SLA controller 22 may determine if an alternate link may satisfy the given SLA (616). If SLA controller 22 determines that no alternate link satisfies the given SLA (NO branch of 616), SLA controller 22 may generate a QoE error message and continue using the previously selected link (618).

If SLA controller 22 determines that an alternate link satisfies the given SLA (YES branch of 616), SLA controller 22 may determine whether a plurality of alternate links satisfy the given SLA (620). If SLA controller 22 determines that a single alternate link satisfies the given SLA (NO branch of 620), SLA controller 22 may select a new path along that alternate link (622). In some examples, SLA controller 22 may also reset the counter. In response, SLA controller 22 may instruct VRR 17 to add a respective path community identifying the selected link to a route advertisement (624). If SLA controller 22 determines that multiple alternate links satisfy the given SLA (YES branch of 620), SLA controller 22 may select a path along the link with the least load (626). For example, SLA controller may select a path along the link satisfying the least number of SLAs 18. In response, SLA controller 22 may instruct VRR 17 to add a respective path community identifying the selected link to a route advertisement (624).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

Various examples of the invention have been described. These and other examples are within the scope of the following claims.

What is claimed is:

1. A method comprising:
   receiving, by a virtual route reflector (VRR) executed on an intermediate router positioned between a hub router and a plurality of spoke routers in a hub-and-spoke network and in response to a previous path along a previously selected link of a plurality of links coupled to the hub router and the plurality of spoke routers violating one or more service level agreements (SLAs), instructions for the VRR to add a path community to a route advertisement, wherein the path community is associated with a new path along an alternate link of the plurality of links that satisfies the one or more SLAs;
   receiving, by the VRR and from a first router of the hub router and the plurality of spoke routers, the route advertisement including information identifying a virtual routing and forwarding (VRF) instance, wherein the VRF instance is mapped to the one or more SLAs;
   adding, by the VRR and to the route advertisement, the path community associated with the new path along the alternate link that satisfies the one or more SLAs; and
   sending, by the VRR and to a second router of the hub router and the plurality of spoke routers, the route advertisement including the path community to direct the second router to send traffic to the first router via the new path rather than the previous path.

2. The method of claim 1, wherein the new path comprises a Generic Routing Encapsulation (GRE) overlay tunnel.

3. The method of claim 1, wherein receiving the instructions further comprises:
   receiving the instructions from a controller that performs one or more link state measurements of the plurality of links coupled to the hub router and the plurality of spoke routers, wherein the plurality of links includes the previously selected link and the alternate link.

4. The method of claim 3, wherein the controller is executed on the intermediate router.

5. The method of claim 1, wherein the route advertisement including information identifying the VRF instance comprises at least a route distinguisher and a border gateway protocol (BGP) extended community that uniquely identifies the VRF instance.

6. The method of claim 1,
wherein the route advertisement further includes a default summary route of the hub router, and
wherein the second router is at least one of the plurality of spoke routers.

7. The method of claim 1,
wherein the route advertisement includes at least an Internet Protocol (IP) prefix identifying a subnet of one of the plurality of spoke routers, and
wherein the second router is the hub router.

8. The method of claim 1, further comprising:
wherein the route advertisement comprises a first route advertisement;
receiving, by the VRR, a second route advertisement including information identifying a default VRF instance, and
wherein the default VRF instance includes all available paths along the plurality of links coupled to the hub router and the plurality of spoke routers, including the previously selected link and the alternate link.

9. A network device comprising:
a memory; and
one or more processors operably coupled to the memory, wherein the one or more processors are configured to:
execute a virtual route reflector (VRR) on the network device positioned between a hub router and plurality of spoke routers in a hub-and-spoke network;
receive, in response to a previous path along a previously selected link of a plurality of links coupled to the hub router and the plurality of spoke routers violating one or more service level agreements (SLAs), instructions for the VRR to add a path community to a route advertisement, wherein the path community is associated with a new path along an alternate link of the plurality of links that satisfies the one or more SLAs;
receive, from a first router of the hub router and the plurality of spoke routers, the route advertisement including information identifying a virtual routing and forwarding (VRF) instance, wherein the VRF instance is mapped to the one or more SLAs;
add, to the route advertisement, the path community associated with the new path along the alternate link that satisfies the one or more SLAs; and
send, to a second router of the hub router and the plurality of spoke routers, the route advertisement including the path community to direct the second router to send traffic to the first router via the new path rather than the previous path.

10. The network device of claim 9, wherein the new path comprises a Generic Routing Encapsulation (GRE) overlay tunnel.

11. The network device of claim 9, wherein, to receive the instructions, the one or more processors are further configured to:
receive the instructions from a controller that performs one or more link state measurements of the plurality of links coupled to the hub router and the plurality of spoke routers, wherein the plurality of links includes the previously selected link and the alternate link.

12. The network device of claim 9, wherein the route advertisement including information identifying the VRF instance comprises at least a route distinguisher and a border gateway protocol (BGP) extended community that uniquely identifies the VRF instance.

13. The network device of claim 9,
wherein the route advertisement further includes a default summary route of the hub router, and
wherein the second router is at least one of the plurality of spoke routers.

14. The network device of claim 9,
wherein the route advertisement includes at least an Internet Protocol (IP) prefix identifying a subnet of one of the plurality of spoke routers, and
wherein the second router is the hub router.

15. The network device of claim 9,
wherein the route advertisement comprises a first route advertisement,
wherein the one or more processors are further configured to receive a second route advertisement including information identifying a default VRF instance, and
wherein the default VRF instance includes all available paths along the plurality of links coupled to the hub router and the plurality of spoke routers, including the previously selected link and the alternate link.

* * * * *